United States Patent
Sim et al.

(10) Patent No.: US 10,042,395 B2
(45) Date of Patent: Aug. 7, 2018

(54) METHOD OF FORMING COMPOSITE FIBER LAMINATE WITH VARIABLE ELASTICITY AND DEVICE THEREOF

(71) Applicant: Dell Products, LP, Round Rock, TX (US)

(72) Inventors: Simon Sim, Shanghai (CN); Deeder M. Aurongzeb, Round Rock, TX (US); B. Bryce Busby, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 567 days.

(21) Appl. No.: 14/052,047

(22) Filed: Oct. 11, 2013

(65) Prior Publication Data
US 2015/0102712 A1 Apr. 16, 2015

(51) Int. Cl.
*G06F 1/16* (2006.01)
*B29C 70/30* (2006.01)
*B29L 31/34* (2006.01)

(52) U.S. Cl.
CPC ............ *G06F 1/1656* (2013.01); *B29C 70/30* (2013.01); *B29L 2031/3481* (2013.01)

(58) Field of Classification Search
CPC ....... B29C 70/30; B29C 70/08; B29C 70/202; B29C 70/48; G06F 1/1656; G06F 1/1601; G06F 1/1633; G06F 1/1613; G06F 1/181; G06F 1/16; B29L 2031/3481; B32B 37/0038; B32B 37/144; B32B 37/182; B32B 38/08; Y10T 156/1089; Y10T 156/1092; Y10T 156/1093
USPC .......................................... 156/307.1–307.7
See application file for complete search history.

(56) References Cited

U.S. PATENT DOCUMENTS

| | | | | |
|---|---|---|---|---|
| 4,872,780 A | * | 10/1989 | Bowman | ................. E02D 29/14 404/26 |
| 6,476,111 B1 | * | 11/2002 | Beauchemin | ........... C08L 33/12 524/423 |
| 6,585,842 B1 | * | 7/2003 | Bompard | ............. B29C 70/202 156/166 |
| 7,846,528 B2 | | 12/2010 | Johnson et al. | |
| 7,875,337 B2 | | 1/2011 | Green | |
| 8,263,205 B2 | | 9/2012 | Kweder | |
| 2010/0132904 A1 | * | 6/2010 | Ajoviita | ............... D21G 1/0233 162/358.3 |
| 2010/0315299 A1 | * | 12/2010 | Bibl | ..................... H04R 1/1033 343/702 |

(Continued)

FOREIGN PATENT DOCUMENTS

DE 102011012900 A1 * 2/2012 ............. B29C 70/08
EP 0340395 A2 * 11/1989 ........... B29C 31/085

OTHER PUBLICATIONS

Machine translation of DE 102011012900 date unknown.*
Machine translation of EP 0340395 date unknown.*

*Primary Examiner* — John Goff
(74) *Attorney, Agent, or Firm* — Larson Newman, LLP

(57) ABSTRACT

A method for fabricating a laminated composite work piece includes providing a first layer of carbon fiber. The first layer extends continuously across the entire area of the work piece. A second layer is placed adjacent to the first layer. The second layer includes a first fiber material extending across a first portion of the work piece, and a second fiber material extending across a second portion of the work piece. The work piece is cured and provides a case component of an information handling system.

13 Claims, 8 Drawing Sheets

(56) References Cited

U.S. PATENT DOCUMENTS

| | | | |
|---|---|---|---|
| 2011/0117872 A1* | 5/2011 | Tseng | B29C 43/203 |
| | | | 455/347 |
| 2012/0250276 A1* | 10/2012 | Nakajima | G06F 1/1626 |
| | | | 361/752 |
| 2012/0318444 A1* | 12/2012 | Wu | G06F 1/1633 |
| | | | 156/221 |
| 2013/0147330 A1* | 6/2013 | DiFonzo | G06F 1/1656 |
| | | | 312/297 |

* cited by examiner

METHOD OF FORMING COMPOSITE FIBER LAMINATE WITH VARIABLE ELASTICITY AND DEVICE THEREOF

FIELD OF THE DISCLOSURE

The present disclosure generally relates to composite fiber laminates and more particularly to composite fiber laminates with variable elasticity.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. Enclosures for housing information handling systems vary based on the type of system, portability and durability requirements, and other criteria. For example, an enclosure for a personal data device is preferably light weight, but yet strong enough to provide protection from accidental abuse.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
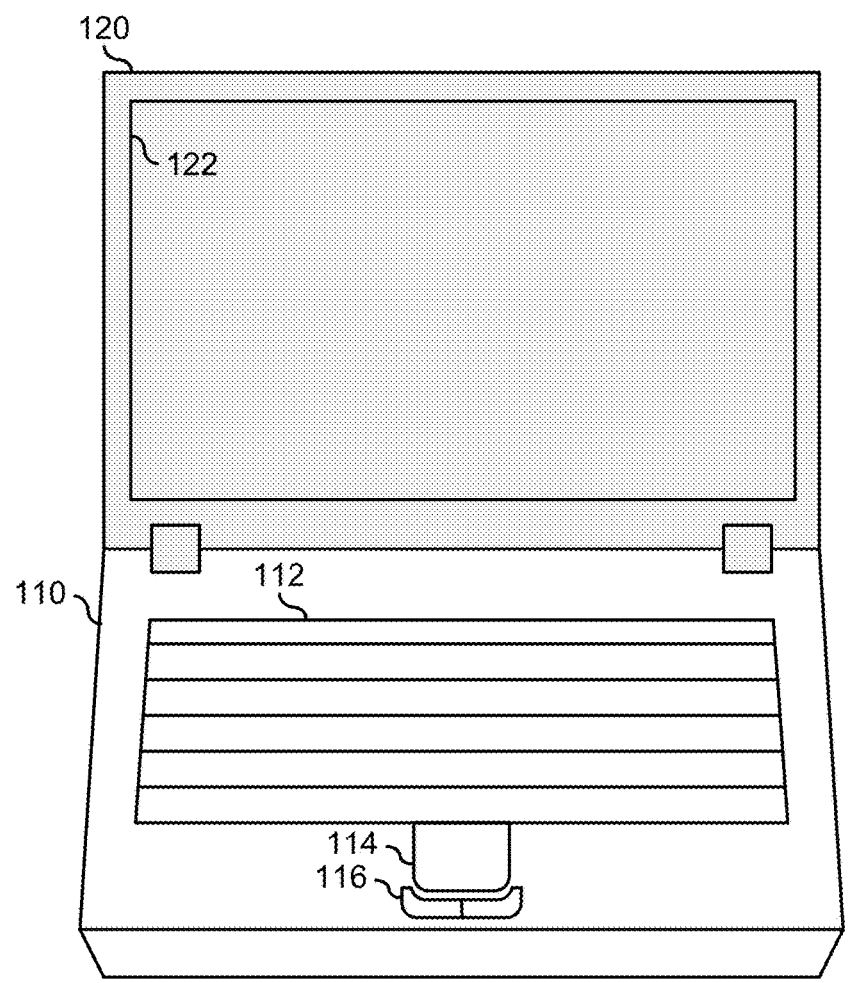
FIG. 1 illustrates an information handling system according to an embodiment of the present disclosure.

FIG. 1 illustrates an information handling system 100. For purpose of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a cellular telephone, a smart phone, a tablet computer, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components. As illustrated herein, an information handling system is represented by a laptop computer system, however the disclosed techniques are generally applicable to components included at other types of information handling systems.

Information handling system 100 includes a base 110 and a cover 120. Base 110 houses one or more portions of the mechanisms that perform the functions of information handling system 100, such as electronic circuit boards, disk drives, sockets and connectors for power or to connect to other devices, and interface devices such as a keyboard 112, a touchpad device 114, and function buttons 116. Cover 120 houses other portions of the mechanisms that perform the functions of information handling system 100, such as wireless communications (WiFi) antennas, indicators, and a display 122. In an embodiment, the base 110, the cover 120, and optionally other portions of the case, chassis, and other work pieces can be constructed using laminated composites. Furthermore, mechanical properties of individual work pieces can be configured for optimal performance characteristics. For example, some portions of a case may benefit from enhanced flexibility, while other portions may be optimized to increase torsional stiffness. Techniques are disclosed herein to provide a work piece having variations in physical properties at selected portions of the work piece.

Figure 2:
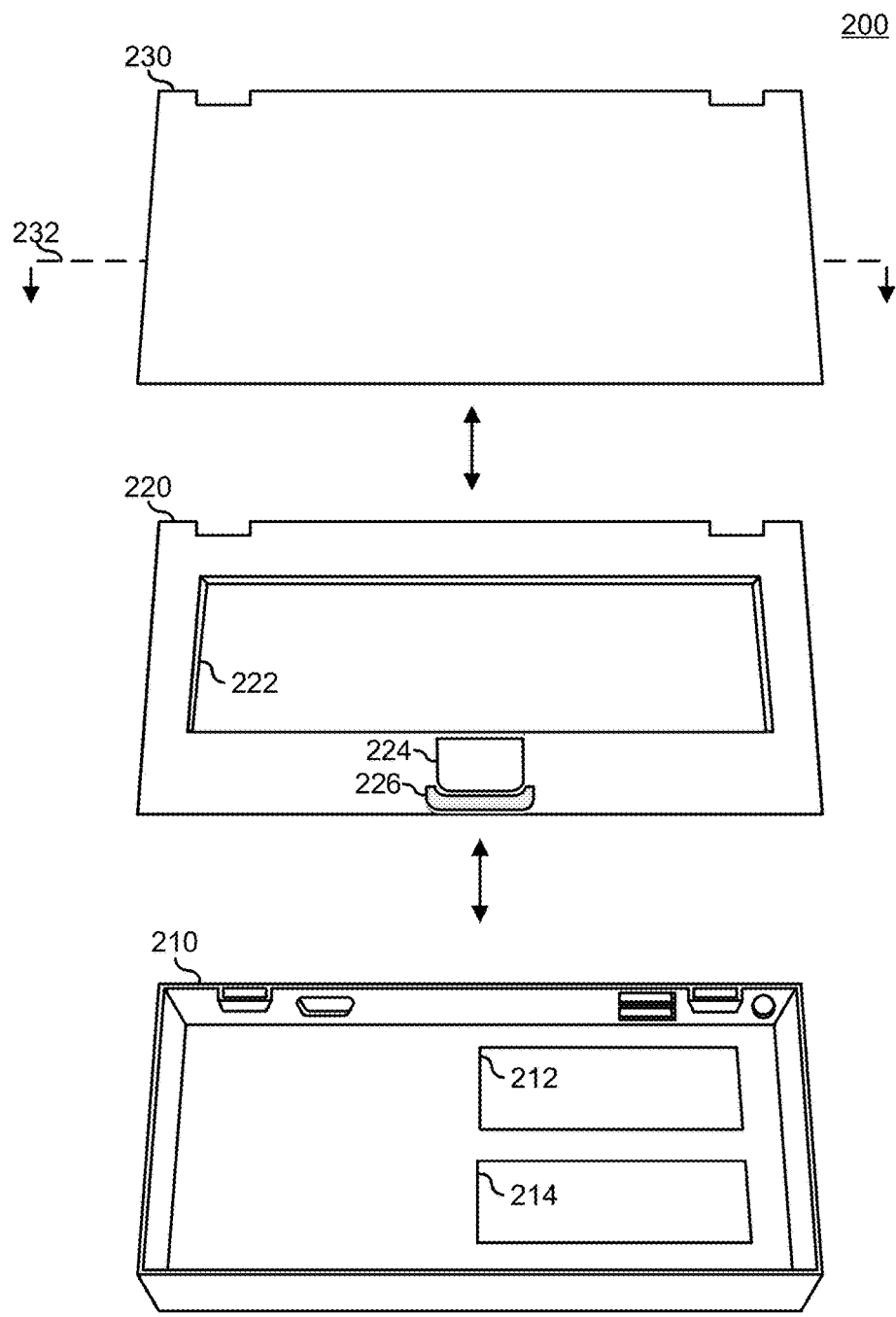
FIG. 2 illustrates case components of the information handling system of FIG. 1 according to a specific embodiment of the present disclosure.

FIG. 2 illustrates case components 200 of the information handling system 100, including a chassis bottom 210, a chassis bottom cover 220, and a chassis top 230. Chassis bottom 210 provides fastening locations for mounting the mechanisms housed in base 110, and includes various openings to accommodate the sockets and connections. In addition, chassis bottom 210 includes a hard-drive opening 212 and a battery opening 214. Hard-drive opening 212 and battery opening 214 are configured to accept respective covers and are operable to permit a user of information handling system 100 to access a hard-drive and a battery for service, repair, or replacement of the respective components within the information handling system. Chassis bottom cover 220 provides fastening locations for attaching the bottom cover to chassis bottom 210 for the purpose of enclosing the mechanisms housed in base 110. Chassis bottom cover 220 includes a keyboard opening 222, a touchpad device opening 224, and a function button opening 226, for allowing the respective keyboard 112, touchpad 114, and function buttons 116 to protrude through the bottom cover. Chassis top 230 provides fastening locations for the display 122 and includes features to facilitate attaching the chassis top 230 to the chassis bottom cover 220. The techniques disclosed herein are illustrated below with respect to the chassis top 230, which provides the external case lid of a laptop computer, but are equally applicable to any laminated component included in an information handling system.

Figure 3:
FIG. 3 illustrates a cross section view of a chassis top of FIG. 2 according to a specific embodiment of the present disclosure.

FIG. 3 illustrates a cross-section view 300 of chassis top 230 according to a specific embodiment of the present disclosure. Cut-away view 300 is a view along cross-section 232 of FIG. 2, and illustrates that chassis top 230 is constructed using a layered composite construction technique as shown in section 310. As such, chassis top 230 is constructed by layering various prepregnated (prepreg) fiber materials, placing the prepregnated fiber materials in a mould and curing the mould to form the desired shape of the bottom housing. A prepreg fiber material includes a layer of fiber material to which a matrix material has been applied. The fiber materials can include strands of the fiber material, a woven fabric of the fiber material, or a combination thereof. The matrix material substantially fills all voids between individual fibers of the fiber material. In a particular embodiment, the matrix material includes a polymer or resin matrix material, and can be a thermoplastic matrix or a thermosetting matrix material. For example, the matrix material can include an epoxy resin, a phenolic resin, polyester resin, vinyl ester resin, another matrix material, or a combination thereof. The fiber materials can include glass fiber, carbon fiber, aramid fiber, natural fiber, or another type of fiber that is prepregnated with the matrix material. The skilled artisan will recognize that there are several methods of prepregnating the fiber material, including a hot melt prepregnation process, a solvent dip prepregnation process, another prepregnation process, or a combination thereof. The moulding process can include a vacuum bag or pressure bag moulding process, a press moulding process, another moulding process, or a combination thereof, as needed or desired.

Figure 4:
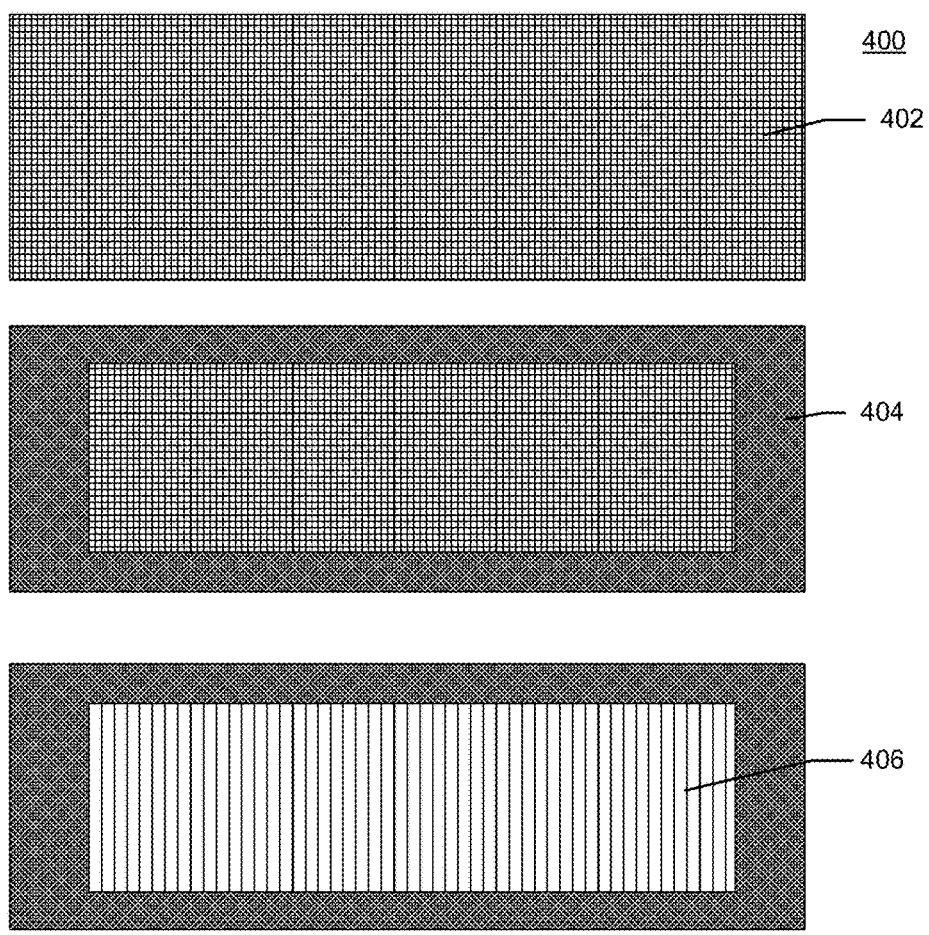
FIG. 4 illustrates a composite layup to implement the chassis top of FIG. 2 according to a specific embodiment of the present disclosure.

FIG. 4 illustrates a composite layup 400 to implement the chassis top 230 according to a specific embodiment of the present disclosure. The chassis top 230 includes a layered composite work piece including a layer 402. In an embodiment, layer 402 is a prepregnated carbon fiber material, where different polymer materials are used to impregnate the carbon fiber material at different portions of the work piece. For example, a perimeter portion 404 of layer 402 can be impregnated with a polymer selected to provide increased stiffness relative to the stiffness of a central portion 406. In an embodiment, the impregnating polymer at the perimeter 404 can include a high-stiffness polymer. For example, the periphery can be at least 5% stiffer than the center portion of the work piece. In addition, the prepreg polymer can be loaded with glass, glass fiber, chopped glass, ceramic fiber, or another filler material known to provide a desired stiffness characteristic at the perimeter region 404 of layer 402. For example, glass, aluminum oxide, boron nitride or silicon carbide can be added to a prepreg polymer so as to constitute five to thirty percent of the total mass of the matrix material. In an embodiment, the Young's modulus of the polymer matrix can vary from 500 MPa to 250 GPa based on density and particle loading. In contrast, a thermoset or thermoplastic polymer matrix material that does not include additional fiber loading can be applied at the central portion 406 of layer 402. So constructed, the resulting work piece exhibits complex stiffness characteristics. For example, it has been determined that a display panel mounted in direct contact to the chassis top 230 is better protected from external damaging blows if the layered composite is somewhat flexible, while it is desirable to have increased torsional stiffness at the perimeter of the chassis top 230. As used herein, the term portion refers to a fractional area of a major surface of a work piece, and includes the entirety of the thickness of one composite layer.

The fiber material 402 can include a woven mat having carbon fibers arranged in orthogonal directions, a sheet having unidirectional fibers, or another fiber arrangement. In a particular embodiment, layer 402 corresponds to an internal layer of the layup 400. In an embodiment, individual carbon fibers included at the fiber material 402 can have a diameter between five and fifteen microns, and the thickness of the layer 402 can be between 0.05 and 0.3 millimeters. In a particular embodiment, the thickness of layer 402 can be approximately 10 microns. The thickness of a woven carbon fiber composite layer can be approximately 0100 microns. In an embodiment, the external-most layer of layup 400, corresponding to the exterior surface of laptop case cover, can include a woven carbon fiber material, selected to provide a tough and visually appealing outer finish. A decorative finish, such as an in-mold release, an in-mold label, a spray painting, a physical vapor deposition, a sputter plating, a paint film, or another decorative finish, as needed or desired can be applied to an external surface of layup 400.

Additional layers of fiber materials can be applied adjacent to layer 402, not shown at FIG. 4. For example, additional layers of unidirectional fiber or woven fiber material can be placed over the layer shown at FIG. 4. The orientation of the fibers at each layer can be selected based on a desired stiffness characteristic of the final work piece. For example, unidirectional material can be oriented so that fibers run in a diagonal direction relative to the primary dimension of the work piece. The additional layers can be applied over the entirety of the work piece to provide a desired torsional or lateral stiffness, flexibility, or other physical properties. In an embodiment, a bonding material can be applied between fiber layers. In other embodiments, a laminated composite can include one or more layers of material other than prepregnated fibers. For example, a carbon fiber material that does not include a prepreg matrix material can be placed at a work piece form, and a matrix material or bonding material applied thereon. In a specific embodiment, the matrix or bonding material can include a filler material configured to increase stiffness of the completed composite. Furthermore, this material can be applied to a fiber material at selected portions of the work piece, while matrix material that does not include stiffening fillers can be applied to the fiber material at other portions of the work piece. For example, the Young's modulus of a particular layer can range from 10-1000 GPa, while the modulus of an adjacent layer can differ by at least 2%, based on an arrangement and orientation of the fiber.

Figure 5:
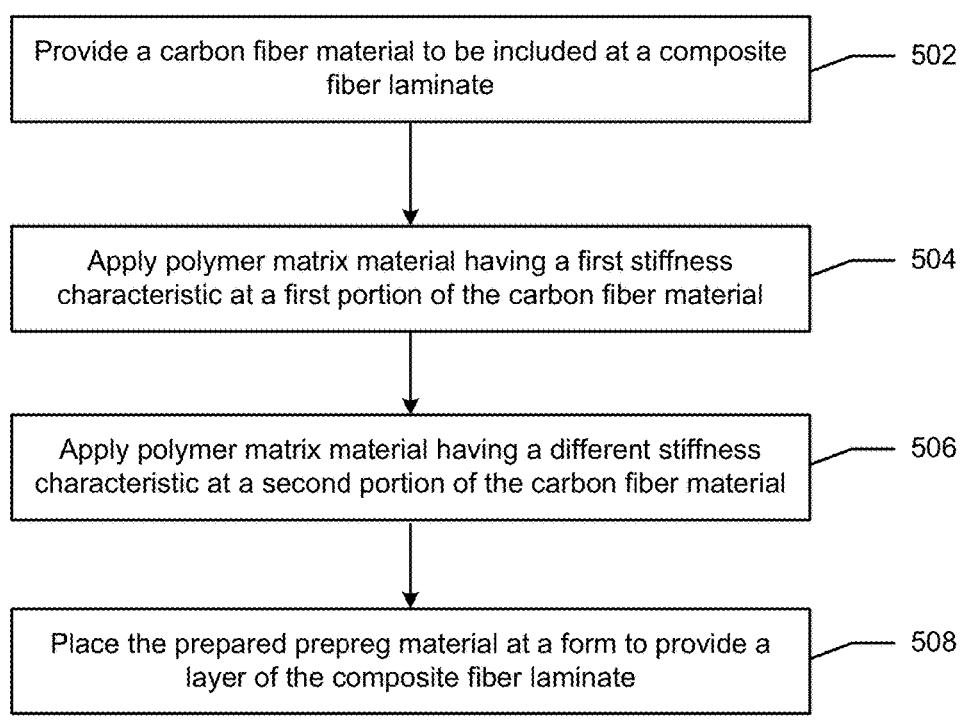
FIG. 5 illustrates a method for forming a composite fiber laminate having variable elasticity according to specific embodiment of the present disclosure.

FIG. 5 illustrates a method 500 for forming a composite fiber laminate having variable elasticity according to specific embodiment of the present disclosure. The method begins at block 502 where a carbon fiber material is provided to be included at a composite laminate. For example, a carbon fiber weave or another fiber material can be prepared for impregnation with a matrix material. The method continues at bock 504 where a polymer matrix material having a first stiffness characteristic is applied at a first portion of the carbon fiber material. For example, a high-stiffness polymer resin can be applied to a perimeter portion of the carbon fiber material, such as perimeter portion 404 of layer 402 at FIG. 4. The method continues at block 506 where a polymer matrix material having a different stiffness characteristic is applied at a second portion of the carbon fiber material. For example, a thermoset or thermoplastic resin can be applied to the remaining area of the work piece, such as portion 406 of layer 402. The method continues at block 508 where the prepared prepreg material is placed at a form to provide a layer of the composite fiber laminate. For example, the prepreg layer, so prepared, can form one of multiple layers of a work piece. In an embodiment, more than one layers of a composite laminate can include a fiber layer having different matrix material applied at selected portions of the fiber layer.

Figure 6:
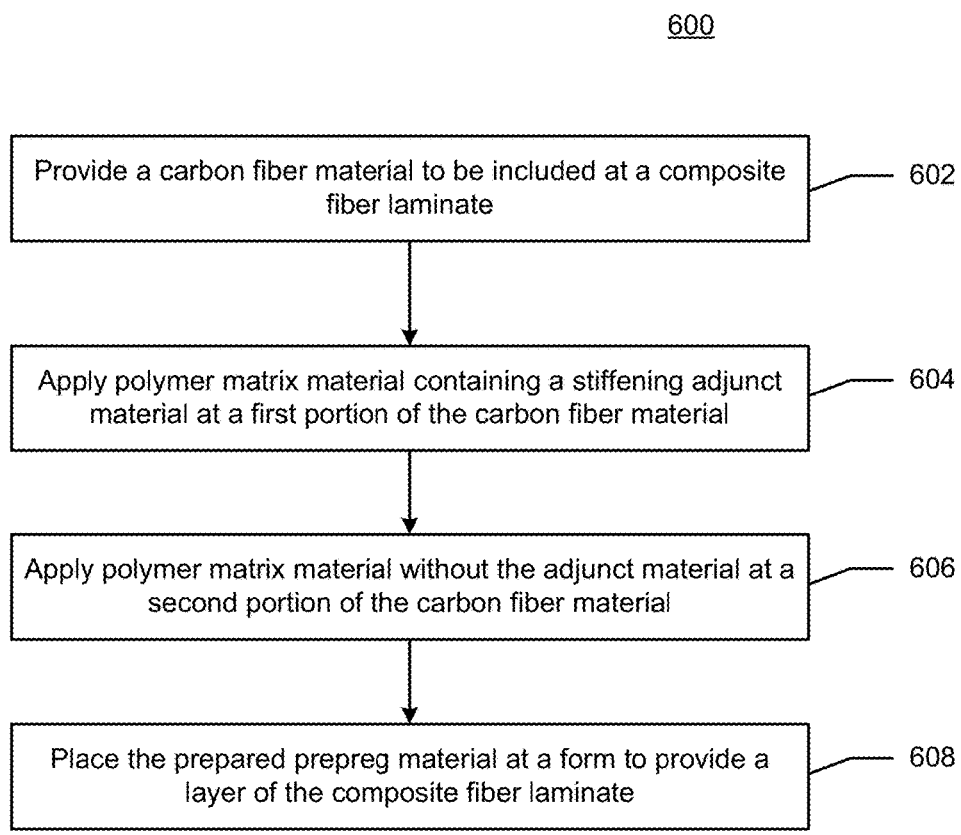
FIG. 6 illustrates a method for forming a composite fiber laminate having variable elasticity according to another embodiment of the present disclosure.

FIG. 6 illustrates a method 600 for forming a composite fiber laminate having variable elasticity according to specific embodiment of the present disclosure. The method begins at block 602 where a carbon fiber material is provided to be included at a composite fiber laminate. For example, a carbon fiber weave or another fiber material can be prepared for polymer impregnation. The method continues at bock 604 where a polymer matrix material containing a stiffening adjunct material is applied at a first portion of the carbon fiber material. For example, chopped glass can be incorporated into a polymer resin and applied to a perimeter portion of the carbon fiber material, such as perimeter portion 404 of FIG. 4. The method continues at block 606 where a polymer matrix material that does not include the adjunct material is applied at a second portion of the carbon fiber material. For example, a thermoset or thermoplastic resin can be applied to the remaining area of the work piece, such as portion 406 at FIG. 4. The method continues at block 608 where the prepared prepreg material is placed at a form to provide a layer of the composite fiber laminate. A composite laminate can include one or more fiber layers prepared in the manner described above to provide differentiated stiffness at selected portions of the work piece. Accordingly, a complex stiffness profile can be provided at a work piece by impregnating specific portions of individual fiber layers with selected matrix materials having desired stiffness characteristics.

As described differentiated stiffness can be achieved by the selective arrangement of matrix material used to impregnate a fiber material. In another embodiment, multiple bonding materials having desired stiffness properties can be applied between fiber layers at selected areas of the work piece. For example, chopped glass can be incorporated into a polymer resin that is applied between fiber layers and at specific locations of the work piece. In another embodiment, a fiber layer can include different fiber materials at selected portions of a work piece. Localized placement of select materials can be better understood with reference to FIGS. 7 and 8.

Figure 7:
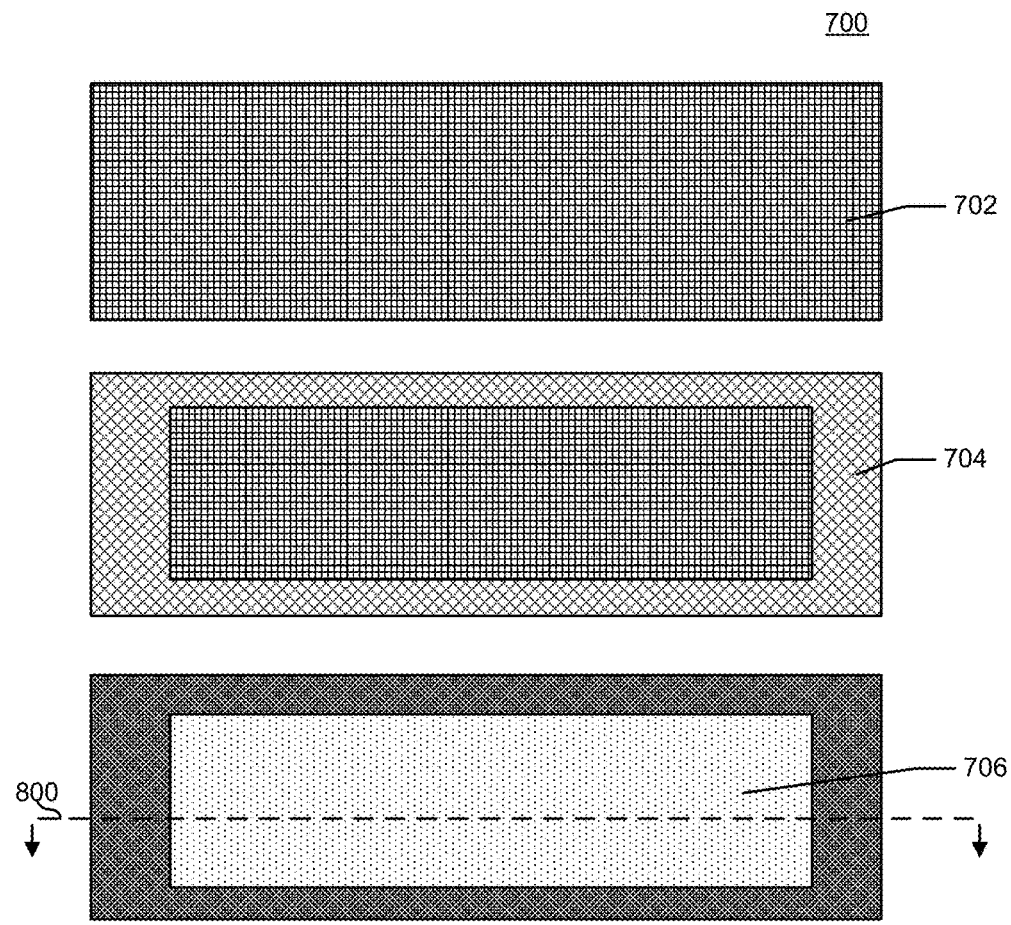
FIG. 7 illustrates a composite layup to implement the chassis top of FIG. 2 according to another embodiment of the present disclosure.

FIG. 7 illustrates a composite layup 700 to implement the chassis top 230 according to another embodiment of the present disclosure. The chassis top 230 includes a layered composite work piece including layer 702. In an embodiment, layer 702 is a single continuous sheet of prepreg carbon fiber material. Fiber material 704 and fiber material 706 are placed over and adjacent to layer 702, and together form a single layer of the layered composite. For example, material 704 is applied at perimeter portions of the work piece, while material 706 can be placed at remaining portions of the work piece not occupied by fiber material 704. In an embodiment, fiber material 704 is different than the fiber material 706. For example, fiber material 704 can include fiber material having a higher modulus than that of material 706 so as to provide greater torsional stiffness at the perimeter of the chassis top 230, while optimizing of the central portions of the chassis flexibility, e.g. a tensile strength 2000-6000 MPa. In another embodiment, fiber materials 704 and 706 can be the compositionally the same, but their fiber orientation or arrangement can differ. For example, fiber material 704 can include fibers oriented in a direction that is different than the direction of fibers of material 706. Alternatively, either of fiber materials 704 and 706 can include woven carbon fiber. In still another embodiment, fiber materials 704 and 706 can be made up of two or more layers of materials. The fiber materials 704 and 706 are distinct pieces.

Additional layers can be applied over the entirety of the work piece, similar to layer 702. Furthermore, one or more additional layers can include two or more materials, each material selectively placed, similar to materials 704 and 706, to provide desired torsional or lateral stiffness, flexibility, or other physical properties at specific portions of the work piece. In an embodiment, a bonding material can be applied between fiber layers.

Figure 8:
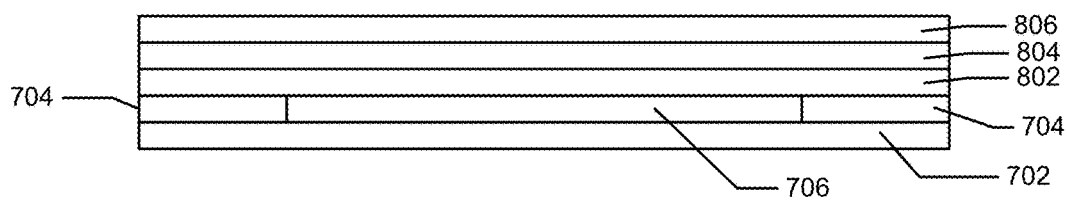
FIG. 8 illustrates a cross section view of the composite layup of FIG. 7 according to a specific embodiment of the present disclosure.

FIG. 8 illustrates a cross section view 700 of composite layup 700 according to a specific embodiment of the present disclosure. The cross section 600 includes the prepreg carbon fiber layer 702 occupying the entirety of the area of the work piece. Fiber material 704 is placed adjacent to layer 702 and occupies only a portion of the area of the work piece. Fiber material 706 is also adjacent to layer 702 and occupies substantially the remaining area of the work piece. The cross section 700 also illustrates additional layers of material, layer 802, layer 804, and layer 806 (not shown at FIG. 7). One or more of the additional layers can include partial layers that occupy a subset of the area of the complete work piece. The area occupied by one or more partial layers can be different than the portion of the work piece having another partial layer. The techniques disclosed herein can be used to implement components having a wide range of final thickness. For example, the thickness of the completed work piece providing chassis top 320 can be less than one millimeter and can include five or more fiber layers, where individual fiber layers can range from 0.1 to 0.3 millimeters in thickness.

In another embodiment, material 704 can include fibers having an arrangement or orientation that is different than the arrangement or orientation of fibers included at fiber material 706. For example, fiber material 704 can include unidirectional fibers oriented at an angle of forty-five degrees relative to a main dimension of the work piece, and additional fiber material having unidirectional fibers oriented perpendicular to these fibers. Accordingly, elastic properties of selected portions of a work piece can be regulated using any or all of the techniques described above.

Figure 9:
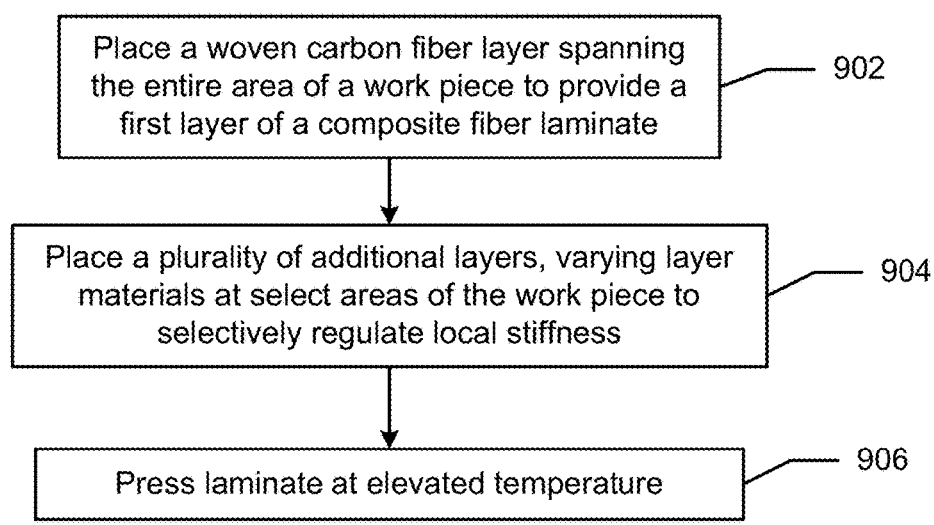
FIG. 9 illustrates a method for providing a laminate composite having varying elasticity according to a specific embodiment of the present disclosure.

FIG. 9 shows a method 900 for providing a laminate composite having varying elasticity according to a specific embodiment of the present disclosure. The method begins at block 902 where a woven carbon fiber layer spanning the entire area of a work piece to provide a first layer of a composite fiber laminate. For example, a uniform fiber material can be placed to provide an aesthetic and durable finish to the external surface of chassis top 230. The method continues at block 904 where a plurality of additional layers are applied adjacent to the woven carbon fiber layer, varying layer materials at select areas of the work piece to selectively regulate local stiffness. For example, a high modulus fiber can be placed at the perimeter portions of a work piece, such as fiber material 704 at FIG. 7, and another fiber material, having a lower modulus can be placed at areas of the of the work piece not already covered, such as fiber material 706 of FIG. 7. The method continues at block 906, where laminate is pressed at an elevated temperature.

In an embodiment, the work piece can include multiple layers of fiber material, and more than one of these layers can consist of two or more fiber materials, placed selectively, as described above. In another embodiment, the techniques shown at FIGS. 7-9 can be combined with the techniques shown at FIGS. 4-6. For example, fiber material 706 can consist of a prepreg fiber where a portion of the area of the layer is impregnated with a matrix material having different stiffness characteristics than a matrix material used to impregnate other portions of the layer. Furthermore, adjunct fibers materials can be added to the matrix resin or to a bonding resin at selected portions of the work piece.

In an embodiment, one or more layers of material incorporated into a laminated composite can be selected based on a coefficient of thermal expansion (CTE) of the material. For example, aromatic polyamide fiber can exhibit negative CTE characteristics, while carbon fiber and glass fiber can exhibit positive CTE characteristics of varying degrees. Accordingly, a layer of aromatic polyamide fiber can be placed adjacent to a carbon fiber layer to limit warping that can occur during the manufacture of the work piece and during use within a product. In another embodiment, a polymer having a desired stiffness can be utilized to impregnate fiber material at selected portions of a work piece. For example, a thermoset polymer can be used to impregnate fiber material at specific portions of a work piece where localized stiffness is desired, while a more flexible thermoplastic can be utilized at other portions of the work piece. In still another embodiment, fiber materials having desired stiffness can be placed at selected portions of the laminated composite to provide localized flexibility characteristics. For example, the perimeter of the chassis top 230 can be stiffened by placing a fiber material having a higher elastic, tensile, or specific modulus at perimeter portions of the work piece, while placing materials having a lower modulus at portions of the work piece where greater flexibility is desired. An example of a polymer fiber having a higher modulus as compared to carbon fiber is the thermoplastic olefin Noryl PPX alloy, which includes a combination of Polyphenylene Ether (PPE) and polypropylene (PP). For example, the fiber layer 804 at FIG. 8 can include a polyamide material and the fiber layer 806 can include a carbon fiber weave.

Figure 10:
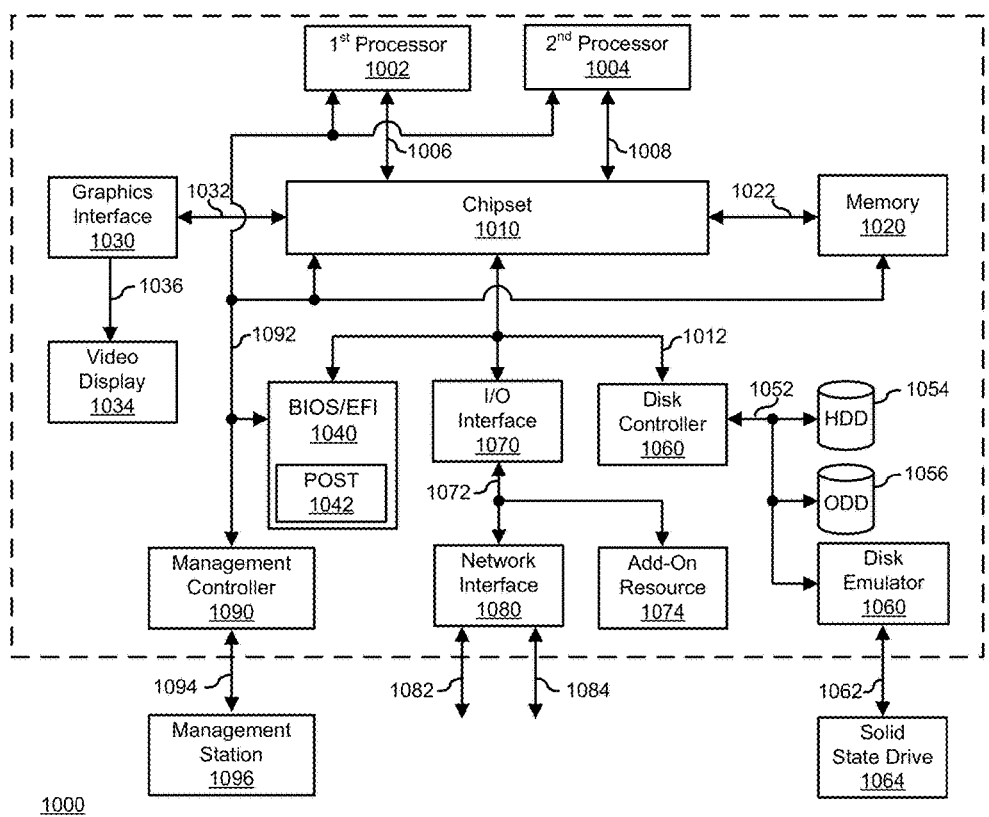
FIG. 10 is a block diagram of an information handling system according to an embodiment of the present disclosure.

FIG. 10 illustrates a generalized information handling system 1000 that can be utilized to carry the methods and to instantiate the devices and modules as described herein. As such, information handling system 1000 can include one or more computer-readable storage mediums that include machine-executable code for performing the methods or that are operated on by the devices and modules for carrying out the operations of the devices and modules described herein. Information handling system 1000 includes a processor 1002 and one or more additional processors 1004, a chipset 1010, a memory 1020, a graphics interface 1030, include a basic input and output system/extensible firmware interface (BIOS/EFI) module 1040, a disk controller 1050, a disk emulator 1060, an input/output (I/O) interface 1070, a network interface 1080, and a management controller (MC) 1090. Processor 1002 is connected to chipset 1010 via processor interface 1006, and processor 1004 is connected to the chipset via processor interface 1008. Memory 1020 is connected to chipset 1010 via a memory bus 1022. Graphics interface 1030 is connected to chipset 1010 via a graphics interface 1032, and provides a video display output 1036 to a video display 1034. In a particular embodiment, information handling system 1000 includes separate memories that are dedicated to each of processors 1002 and 1004 via separate memory interfaces. An example of memory 1020 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 1040, disk controller 1050, and I/O interface 1070 are connected to chipset 1010 via an I/O channel 1012. An example of I/O channel 1012 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 1010 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 1040 includes BIOS/EFI code operable to detect resources within information handling system 1000, to provide drivers for the resources, initialize the resources, and access the resources. BIOS/EFI module 1040 includes code that operates to detect resources within information handling system 1000, to provide drivers for the resources, to initialize the resources, and to access the resources.

Disk controller 1050 includes a disk interface 1052 that connects the disc controller to a hard disk drive (HDD) 1054, to an optical disk drive (ODD) 1056, and to disk emulator 1060. An example of disk interface 1052 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1060 permits a solid-state drive 1064 to be coupled to information handling system 1000 via an external interface 1062. An example of external interface 1062 includes a USB interface, an IEEE 1394 (Firewire) interface, a proprietary interface, or a combination thereof. Alternatively, solid-state drive 1064 can be disposed within information handling system 1000.

I/O interface 1070 includes a peripheral interface 1072 that connects the I/O interface to an add-on resource 1074 and to network interface 1080. Peripheral interface 1072 can be the same type of interface as I/O channel 1012, or can be a different type of interface. As such, I/O interface 1070 extends the capacity of I/O channel 1012 when peripheral interface 1072 and the I/O channel are of the same type, and the I/O interface translates information from a format suitable to the I/O channel to a format suitable to the peripheral channel 1072 when they are of a different type. Add-on resource 1074 can include a data storage system, an additional graphics interface, a network interface card (NIC), a sound/video processing card, another add-on resource, or a combination thereof. Add-on resource 1074 can be on a main circuit board, on separate circuit board or add-in card disposed within information handling system 1000, a device that is external to the information handling system, or a combination thereof.

Network interface 1080 represents a NIC disposed within information handling system 1000, on a main circuit board of the information handling system, integrated onto another component such as chipset 1010, in another suitable location, or a combination thereof. Network interface device 1080 includes network channels 1082 and 1084 that provide interfaces to devices that are external to information handling system 1000. In a particular embodiment, network channels 1082 and 1084 are of a different type than peripheral channel 1072 and network interface 1080 translates information from a format suitable to the peripheral channel to a format suitable to external devices. An example of network channels 1082 and 1084 includes InfiniBand channels, Fibre Channel channels, Gb Ethernet channels, proprietary channel architectures, or a combination thereof. Network channels 1082 and 1084 can be coupled to external network resources (not illustrated). The network resource can include another information handling system, a data storage system, another network, a grid management system, another suitable resource, or a combination thereof.

MC 1090 is connected to processors 1002 and 1004, chipset 1010, memory 1020, and BIOS/EFI module 1040 via a system communication bus 1092. MC 1090 may be on a main circuit board (e.g., a baseboard, a motherboard, or a combination thereof), integrated onto another component such as chipset 1010, in another suitable location, or a combination thereof. In a particular embodiment, one or more additional resources of information handling system 1000, such as graphics interface 1030, video display 1034, I/O interface 1070, disk controller 1050, and network interface 1080 are connected to MC 1090. MC 1090 can be part of an integrated circuit or a chip set within information handling system 1000, and can be on a main circuit board, on separate circuit board or add-in card disposed within the information handling system, or a combination thereof. An example of MC 1090 includes a baseboard management controller (BMC), an integrated Dell remote access controller (iDRAC), another controller, or a combination thereof. An example of system communication bus 1092 includes an inter-integrated circuit ($I^2C$) bus, a system management bus (SMBus), a serial peripheral interface (SPI) bus, a low pin count (LPC) bus, another bus, or a combination thereof.

MC 1090 is connected via a network channel 1094 to a management station 1096 that is external to information handling system 1000. Management station 1096 operates in conjunction with management controller 1090 to provide out-of-band management of information handling system 1000. Commands, communications, or other signals are communicated between MC 1090 and management station 1096 to monitor status of information handling system 1000, to control the operations of the resources of the information handling system, and to update the resources. In a particular embodiment, MC 1090 is powered by a separate power plane in information handling system 1000, so that the MC can be operated while other portions of the information handling system are powered off. In another embodiment, MC 1090 is operated during boot of information handling system 1000).

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

What is claimed is:

1. A method for fabricating a laminated composite work piece to provide a case component of an information handling system, the method comprising:
   providing a planar first layer including carbon fiber and resin, the first layer extending continuously across the entire area of a major surface of the work piece;
   providing a second planar layer adjacent to the first layer, the second layer including:
      a first fiber material extending across a first portion of the work piece, the first fiber material including carbon fiber and resin; and
      a second fiber material different than the first fiber material extending across a second portion of the work piece, the second portion adjacent to but not overlapping the first portion, the second fiber material including carbon fiber and resin, the first and second fiber materials being distinct pieces;
   curing the resin of the work piece; and
   incorporating the work piece at the information handling system.

2. The method of claim 1, wherein:
   the first fiber material is selected to provide a first stiffness characteristic at the first portion of the work piece, and
   the second fiber material is selected to provide a second stiffness characteristic at the second portion of the work piece, the second stiffness characteristic different from the first stiffness characteristic.

3. The method of claim 1, further comprising:
   providing a planar third fiber layer adjacent to the second layer, the third fiber layer having a negative coefficient of thermal expansion to limit warping of the work piece.

4. The method of claim 1, wherein:
   the first fiber material includes fibers arranged exclusively in a first direction parallel to the major surface of the work piece; and
   the second fiber material includes fibers arranged in a second direction parallel to the major surface of the work piece and different from the first direction.

5. The method of claim 1, wherein the first layer includes carbon fiber prepregnated with a first resin matrix material containing a chopped glass fiber adjunct.

6. The method of claim 1, wherein:
   the first fiber material is prepregnated with a first resin matrix material including between 5% and 30% by total mass of the first resin matrix material of a second adjunct material selected from aluminum oxide, boron nitride, silicon carbide, or any combination thereof; and
   the second fiber material is prepregnated with a second resin matrix material that does not include adjunct.

7. The method of claim 1, wherein a bonding material that does not include fiber is applied between the first layer and the second layer.

8. A method for fabricating a laminated composite work piece to provide a case component of an information handling system, the method comprising:
   impregnating a first fiber material with a first matrix material, the first matrix material including between 5% and 30% by total mass of the first matrix material of an adjunct material selected from aluminum oxide, boron nitride, silicon carbide, or any combination thereof, the first fiber material positioned at a first portion of a planar first layer;

impregnating a second fiber material with a second matrix material different than the first matrix material, the second fiber material positioned at a second portion of the planar first fiber layer, the first fiber material and the second fiber material being distinct pieces, the second portion adjacent to but not overlapping the first portion; and incorporating the work piece at the information handling system.

9. The method of claim 8, wherein a modulus of the first matrix material is different than a modulus of the second matrix material.

10. The method of claim 8, wherein the adjunct material of the first matrix material increases the stiffness at a first portion of the work piece relative to a stiffness at a second portion of the work piece.

11. The method of claim 10, wherein the first matrix material has a Young's modulus of between 500 MPa to 250 GPa.

12. The method of claim 8, further comprising:
placing a second fiber layer adjacent to the first fiber layer, the second fiber layer including carbon fiber and extending continuously across the entire area of a major surface of the work piece.

13. The method of claim 8, further comprising:
placing a second fiber layer adjacent to the first fiber layer, the second fiber layer having a negative coefficient of thermal expansion to limit warping of the work piece.

* * * * *